US007516001B2

(12) United States Patent
Harumoto et al.

(10) Patent No.: US 7,516,001 B2
(45) Date of Patent: Apr. 7, 2009

(54) CONTROL APPARATUS FOR AN IN-VEHICLE DEVICE, CONTROL METHOD FOR AN IN-VEHICLE DEVICE, AND CONTROL PROGRAM FOR AN IN-VEHICLE DEVICE

(75) Inventors: Satoshi Harumoto, Hyogo (JP); Toshitaka Yamato, Hyogo (JP); Hiroshi Takeuchi, Hyogo (JP); Yoshihiko Maeno, Hyogo (JP); Kazuhiro Sakiyama, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 842 days.

(21) Appl. No.: 10/902,802

(22) Filed: Aug. 2, 2004

(65) Prior Publication Data

US 2005/0060072 A1 Mar. 17, 2005

(30) Foreign Application Priority Data

Jul. 31, 2003 (JP) .......................... P2003-284525

(51) Int. Cl.
*H04N 5/445* (2006.01)
*H04B 1/06* (2006.01)
*G06F 3/00* (2006.01)
*G06F 7/00* (2006.01)

(52) U.S. Cl. .......................... 701/36; 348/143; 348/148

(58) Field of Classification Search .................. 348/118
See application file for complete search history.

(56) References Cited

U.S. PATENT DOCUMENTS

| | | | | |
|---|---|---|---|---|
| 6,002,326 | A * | 12/1999 | Turner | 340/426.1 |
| 6,023,290 | A * | 2/2000 | Seita | 348/118 |
| 6,275,231 | B1 * | 8/2001 | Obradovich | 345/156 |
| 6,374,177 | B1 * | 4/2002 | Lee et al. | 701/200 |
| 2002/0087981 | A1 * | 7/2002 | Daniels | 725/38 |

FOREIGN PATENT DOCUMENTS

| | | |
|---|---|---|
| CN | 1264253 | 8/2000 |
| JP | A-10-112824 | 4/1998 |
| JP | A-10-174176 | 6/1998 |
| JP | A-2000-175276 | 6/2000 |
| JP | A 2000-184352 | 6/2000 |
| JP | A-2001-036652 | 2/2001 |
| JP | A 2001-65212 | 3/2001 |
| JP | A 2002-34085 | 1/2002 |
| JP | A-2002-320280 | 10/2002 |
| JP | A-2002-369179 | 12/2002 |
| JP | A 2003-158690 | 5/2003 |

* cited by examiner

*Primary Examiner*—Thomas G Black
*Assistant Examiner*—Sarah S Shin
(74) *Attorney, Agent, or Firm*—Oliff & Berridge, PLC

(57) ABSTRACT

A control apparatus for an in-vehicle device includes an acquisition/transmission unit and a recording unit. The acquisition/transmission unit acquires a program guide corresponding to a position of a vehicle and transmits the acquired program guide to a communication terminal device. The recording unit selects at least one program from the acquired program guide on a basis of an instruction transmitted from the communication terminal device and records at least one of video and audio of the selected program.

5 Claims, 6 Drawing Sheets

FIG. 3

| CHANNEL | AREA A | AREA B |
|---|---|---|
| 1CH | a STATION | |
| 2CH | | a STATION |
| 3CH | b STATION | e STATION |
| 4CH | | b STATION |
| 5CH | c STATION | |
| 6CH | d STATION | c STATION |

CONTROL APPARATUS FOR AN IN-VEHICLE DEVICE, CONTROL METHOD FOR AN IN-VEHICLE DEVICE, AND CONTROL PROGRAM FOR AN IN-VEHICLE DEVICE

BACKGROUND OF THE INVENTION

1. Field of the Invention

This invention is made to solve the problems in the above-described conventional technologies. In particular, this invention provides a control apparatus for an in-vehicle device, a control method for an in-vehicle device, and a control program for an in-vehicle device, which can record a broadcasting program of a broadcasting receiver which corresponds to a position of a vehicle and record images captured by a camera in preference to a broadcasting program during recording of the broadcasting program.

2. Description of the Related Art

Conventionally, an apparatus for an in-vehicle device for remotely controlling a device mounted on a vehicle on the basis of instructions by a communication terminal device connected thereto over wireless has been known widely. For example, JP-A-2002-34085 discloses a technology for remotely controlling an in-vehicle audio device by a wireless communication terminal. In addition, JP-A-2001-65212 discloses a technology for displaying image data of an intruder into a vehicle as an image, through a communication network.

SUMMARY OF THE INVENTION

In the technology of JP-A-2002-34085, it is possible to remotely control an in-vehicle audio device by a wireless communication terminal. However, the technology of JP-A-2003-34085 cannot record a broadcasting program of a television or a radio in which a correspondence of channels to broadcasting stations differs depending on an area. That is, with regard to broadcastings of a television or a radio, a correspondence of channels to broadcasting stations differ depending upon an area in which a vehicle runs. Therefore, it is not possible for the technology of JP-A-2003-34085 to record a desired broadcasting program.

In addition, in the technology of JP-A-2001-65212, it is possible to display image data of an intruder into a vehicle through a communication network. However, the technology of JP-A-2001-65212 cannot record image data of an intruder into a vehicle, when a broadcasting program of a television or a radio is being recorded. That is, in the technology of JP-A-2001-65212, it is impossible to record images, which show inside and outside a vehicle and are captured by a camera, in preference to a broadcasting program during recording of the broadcasting program.

This invention is made to solve the problems in the above-described conventional technologies. In particular, this invention provides a control apparatus for an in-vehicle device, a control method for an in-vehicle device, and a control program for an in-vehicle device, which can record a broadcasting program of a broadcasting receiver which correspond to a position of a vehicle and record images captured by a camera in preference to a broadcasting program during recording of the broadcasting program.

In order to solve the above-described problem, according to one embodiment of this invention, a control apparatus for an in-vehicle device includes an acquisition/transmission unit and a recording unit. The acquisition/transmission unit acquires a program guide corresponding to a position of a vehicle and transmits the acquired program guide to a communication terminal device. The recording unit selects at least one program from the acquired program guide on a basis of an instruction transmitted from the communication terminal device and records at least one of video and audio of the selected program.

With this configuration, the control apparatus can acquire the program guide corresponding to the position of the vehicle; transmit the acquired program guide to a communication terminal device, select the at least one program from the acquired program guide on the basis of the instruction transmitted from the communication terminal device; and record the at least one of video and audio of the selected program.

Therefore, the control apparatus thus configured has an advantage that it is possible to record a program, which a broadcasting receiver receives and corresponds to the position of the vehicle.

Also, in addition to the above-described configuration, the control apparatus may further include a program-guide database. The program-guide database stores information indicating a correspondence relation at least among areas, broadcast stations, and frequencies; and the program guide for each area. In this case, the acquisition/transmission unit acquires the program guide corresponding to the position of the vehicle from the program-guide database and transmits the acquired program guide to the communication terminal device.

With this configuration, it is possible to acquire the program guide corresponding to the position of the vehicle from program-guide data base and to transmit it to the communication terminal device.

Therefore, the control apparatus thus configured has an advantage that it is possible to easily acquire the program guide at any time and to record a program corresponding to the position of the vehicle.

Also, in addition to the above-described configuration, the acquisition/transmission unit may acquire the program guide corresponding to the position of the vehicle, which is pinpointed by a navigation system of the vehicle, and transmit the acquired program guide to the communication terminal device.

With this configuration, it is possible to acquire the program guide corresponding to the position of the vehicle, which is pinpointed by the navigation system of the vehicle, from program-guide data base, and to transmit it to the communication terminal device.

Therefore, the control apparatus thus configured has an advantage that it is possible to easily identify the position of the vehicle and to record the program corresponding to the position of the vehicle.

Also, in addition to the above-described configuration, the control apparatus may further include an image capturing unit and an interruption control unit. The image capturing unit captures at least one of an inside and an outside of the vehicle. The interruption control unit controls the recording unit to record the image captured by the image capturing unit in preference to the video and audio of the selected program, on a basis of the instruction transmitted from the communication terminal device.

With this configuration, it is possible to capture at least one of an inside and an outside of the vehicle, and record the image captured by the image capturing unit in preference to the video and audio of the selected program on the basis of the instruction transmitted from the communication terminal device.

Therefore, the control apparatus thus configured has an advantage that it is possible to control the recording unit to record the image captured by the image capturing unit in preference to the video and audio of the selected program, on a basis of the instruction transmitted from the communication terminal device.

In addition, according to one embodiment of the invention, a method for controlling an in-vehicle device includes acquiring a program guide corresponding to a position of a vehicle; transmitting the acquired program guide to a communication terminal device; selecting at least one program from the acquired program guide on a basis of an instruction transmitted from the communication terminal device; and recording at least one of video and audio of the selected program.

According to this control method, it is possible to acquire a program guide corresponding to a position of a vehicle; transmit the acquired program guide to a communication terminal device; select at least one program from the acquired program guide on a basis of an instruction transmitted from the communication terminal device; and record at least one of video and audio of the selected program.

Therefore, the above-described control method has an advantage that it is possible to record the program corresponding to the position of the vehicle.

In addition, according to one embodiment of the invention, a program causes a computer to execute a procedure including: acquiring a program guide corresponding to a position of a vehicle; transmitting the acquired program guide to a communication terminal device; selecting at least one program from the acquired program guide on a basis of an instruction transmitted from the communication terminal device; and recording at least one of video and audio of the selected program.

According to this control program for an in-vehicle device, it is possible to acquire a program guide corresponding to a position of a vehicle; transmit the acquired program guide to a communication terminal device; select at least one program from the acquired program guide on a basis of an instruction transmitted from the communication terminal device; and record at least one of video and audio of the selected program.

Therefore, the above-described control program has an advantage that it is possible to record the program corresponding to the position of the vehicle.

BRIEF DESCRIPTION OF THE DRAWINGS

FIG. 3 is a view showing one example of program-guide database shown in FIG. 2.

DETAILED DESCRIPTION OF THE PREFERRED EMBODIMENTS

Hereinafter, with reference to accompanying drawings, preferred embodiments of a control apparatus for an in-vehicle device according to this invention, will be described in detail. In an embodiment 1, described will be a case where the control apparatus for an in-vehicle device is applied to a control system for an in-vehicle device, and the control apparatus for an in-vehicle device records video/audio of a broadcasting program of a television mounted on a vehicle. In an embodiment 2, described will be a case where during recording of a broadcasting program of a television mounted on a vehicle, a control apparatus for an in-vehicle device executes control to record images, which show an inside/outside of a vehicle and are captured by a camera. In addition, finally, various modification examples will be described as another embodiment.

Embodiment 1

Figure 1:
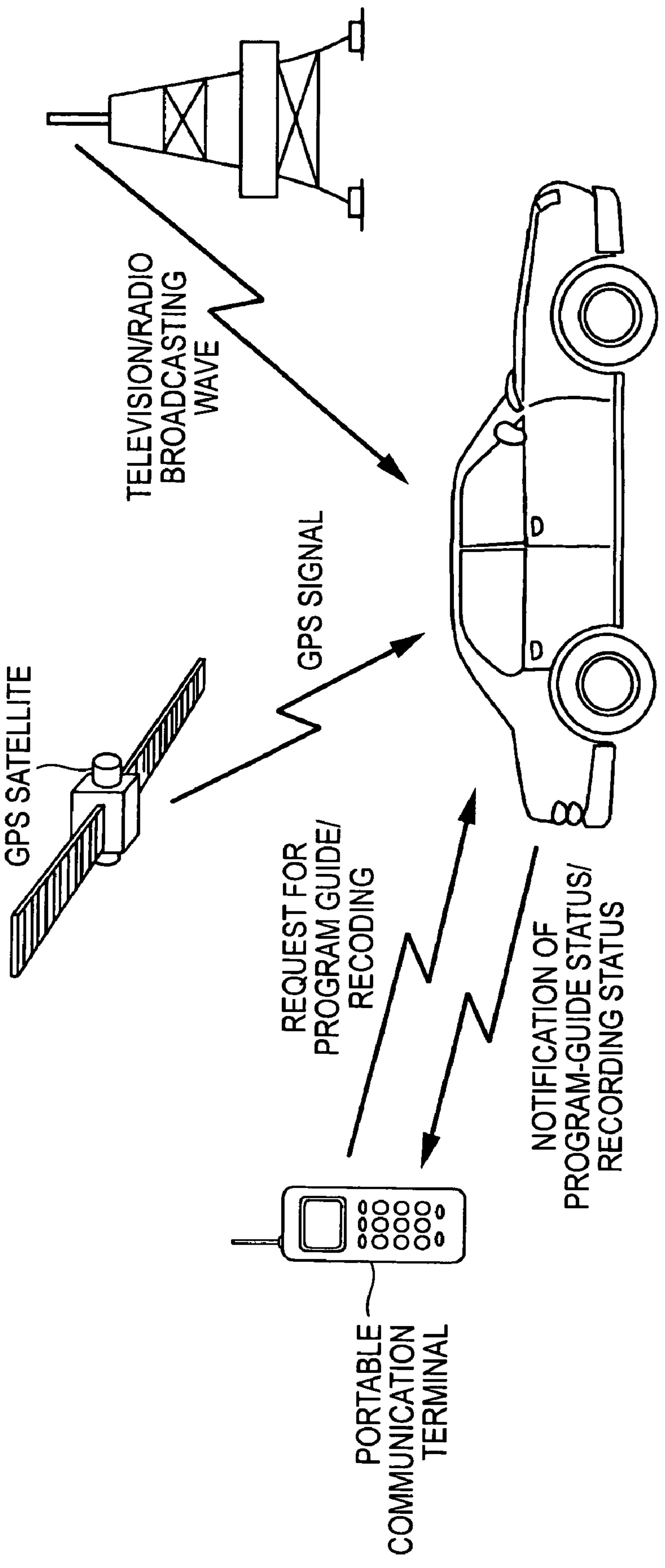
FIG. 1 is a view explaining features of a control system for an in-vehicle device according to an embodiment 1.

FIG. 1 is a view explaining an outline of a control system for an in-vehicle device, according to the embodiment 1. As shown in FIG. 1, the control system for an in-vehicle device according to the embodiment 1 includes a navigation system that receives a GPS signal from a GPS satellite (Global-Positioning-System satellite) to know (grasp) a current position of a vehicle. In addition, the control system includes a display, which receives a broadcasting program of a television and displays video/audio of a television; and a recording device, which records the video/audio of the television. Television broadcasting differs in a correspondence of channels to broadcasting stations, depending on an area. On this account, a broadcasting program maybe changed during running of a vehicle.

Therefore, the control system for an in-vehicle device, according the embodiment 1 acquires a program guide corresponding to a position of a vehicle; and transmits the acquired program guide to a mobile communication terminal; selects a program from the acquired program guide on the basis of an instruction by the portable communication terminal; and records video/audio of the selected program.

Specifically, the control system for an in-vehicle device, performs control to acquire the program guide corresponding to the position of the vehicle from a program-guide data base of the control apparatus for an in-vehicle device; transmits the acquired program guide to a portable communication terminal; selects a program from the acquired program guide on the basis of the instruction by the portable communication terminal; and records the video/audio of the selected program.

For example, the control system for an in-vehicle device acquires a program guide corresponding to a position of a vehicle, which a navigation system of the vehicle pinpoints, from program-guide data base; transmits the acquired program guide to the portable communication terminal; selects a program from the acquired program guide on the basis of the instruction by the portable communication terminal; and records the video/audio of the selected program.

Figure 2:
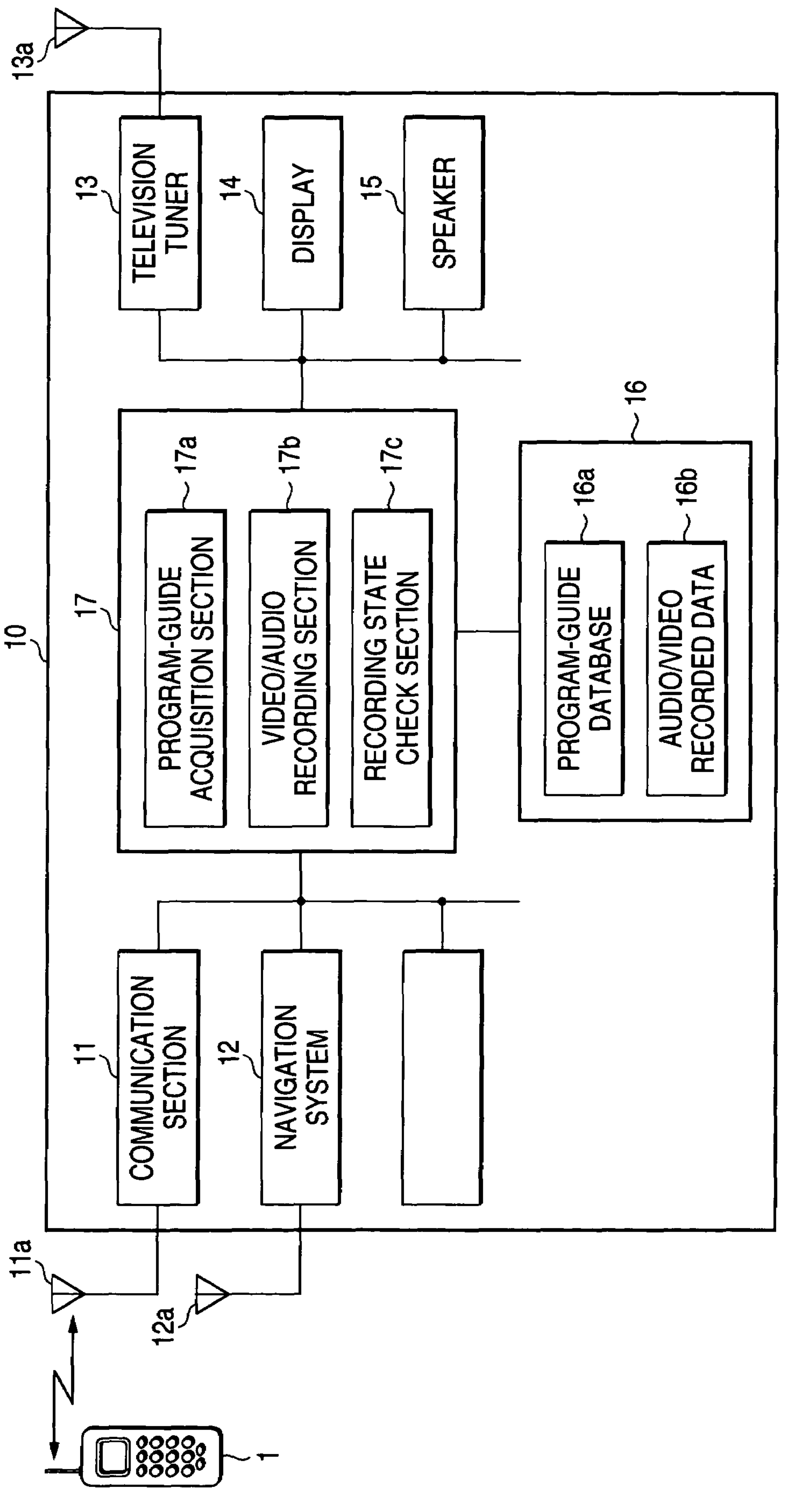
FIG. 2 is a function-block diagram showing a configuration of the control system for an in-vehicle device according to this embodiment 1.

Next, a configuration of the control system for an in-vehicle device according to embodiment 1 will be described. FIG. 2 is a function-block diagram showing a configuration of the control system for an in-vehicle device according to embodiment 1. As shown in FIG. 2, the control system for an in-vehicle device includes a portable communication terminal 1 and a control apparatus 10 for an in-vehicle device. Among these elements, the portable communication terminal 1 is a communication terminal which communicates with the control apparatus 10 for an in-vehicle device, through a wireless network.

The control apparatus 10 for an in-vehicle device includes a communication section 11, a navigation system 12, a television tuner 13, a display 14, a speaker 15, a storage section 16, and a control section 17. The communication section 11 communicates with the portable communication terminal 1 through the wireless network. The communication section 11 includes a communication antenna 11*a*. The communication antenna 11*a* is used for communicating with the portable communication terminal. Specifically, the communication antenna 11*a* is a rod antenna.

The navigation system 12 receives a GPS signal from a GPS satellite to pinpoint a position of a vehicle and provides road information of a road on which a vehicle runs to a driver. The navigation system 12 includes a GPS antenna 12*a*. The GPS antenna 12*a* receives the GPS signal from the GPS satellite.

The television tuner 13 receives electromagnetic waves of television broadcasting; and demodulates and reproduces digital signals; and separates the digital signals into analog video signals and analog audio signals. The television tuner 13 includes a television antenna 13*a*. The television antenna 13*a* receives television electromagnetic waves of a UHF (Ultra High Frequency or VHF (Very High Frequency) band.

The display 14 displays an image output from the navigation system 12 and the analog video signals separated by the television tuner 13. Specifically, the display 14 is a liquid crystal display device such as LCD. In addition, the speaker 15 outputs the analog audio signals separated by the television tuner 13, as audio.

The storage section 16 includes a program-guide data base 16*a* and recorded video/audio-data 16*b*. Specifically, the storage section 16 is an external storage device such as HDD. The program-guide database 16*a* stores a program guide of a television corresponding to the position of the vehicle, which the navigation system 12 pinpoints. In addition, the recorded video/audio-data 16*b* is recorded data into which the analog video signals and the analog audio signals are digitized.

Here, one example of the program-guide database 16*a* shown in FIG. 2 will be described. FIG. 3 is a view showing one example of the program-guide database 16*a* shown in FIG. 2. As shown in FIG. 3, in an area A and an area B, television programs of at least 6channels are broadcast, respectively. In the area A, 1CH, 3Ch, 5Ch, and 6Ch correspond to a station, b station, c station, and d station, respectively. However, in the area B, 2Ch, 3Ch, 4Ch, and 6Ch correspond to a station, e station, b station, and c station, respectively. In this manner, channels (frequency bands), which are utilized for television broadcasting, differ depending upon an area. Therefore, when a vehicle enters from the area A into the area B during running of the vehicle, it is necessary to change a channel in order to watch a desired program.

Returning to explanation of FIG. 2, the control section 17 controls an entirety of the control apparatus 10 for an in-vehicle device, and controls a flow of data of each section. Specifically, the control section 17 includes a program-guide acquisition section 17*a*, a video/audio recording section 17*b*, and a recording-state check section 17*c*. The program guide acquisition section 17*a* acquires the program guide corresponding to the position of the vehicle, for a television mounted on the vehicle. Specifically, the program-guide acquisition section 17*a* acquires the program guide corresponding to the position of the vehicle from the program-guide database 16*a*. For example, the program-guide acquisition section 17*a*acquires a program guide corresponding to the position of the vehicle, which the navigation system 12 of the vehicle pinpoints, from the program-guide database 16*a*.

The video/audio recording section 18*b* selects a program from the program guide acquired by the program-guide acquisition section 17*a* on the basis of an instruction by the portable communication terminal 1, and records video/audio of the program. Specifically, the video/audio recording section 17*b* digitizes the analog video/audio signals, and records the digitalized data into the recorded video/audio-data 16*a*. In addition, the recording-state check section 17*c* checks a recording state of the video/audio of the program.

Figure 4:
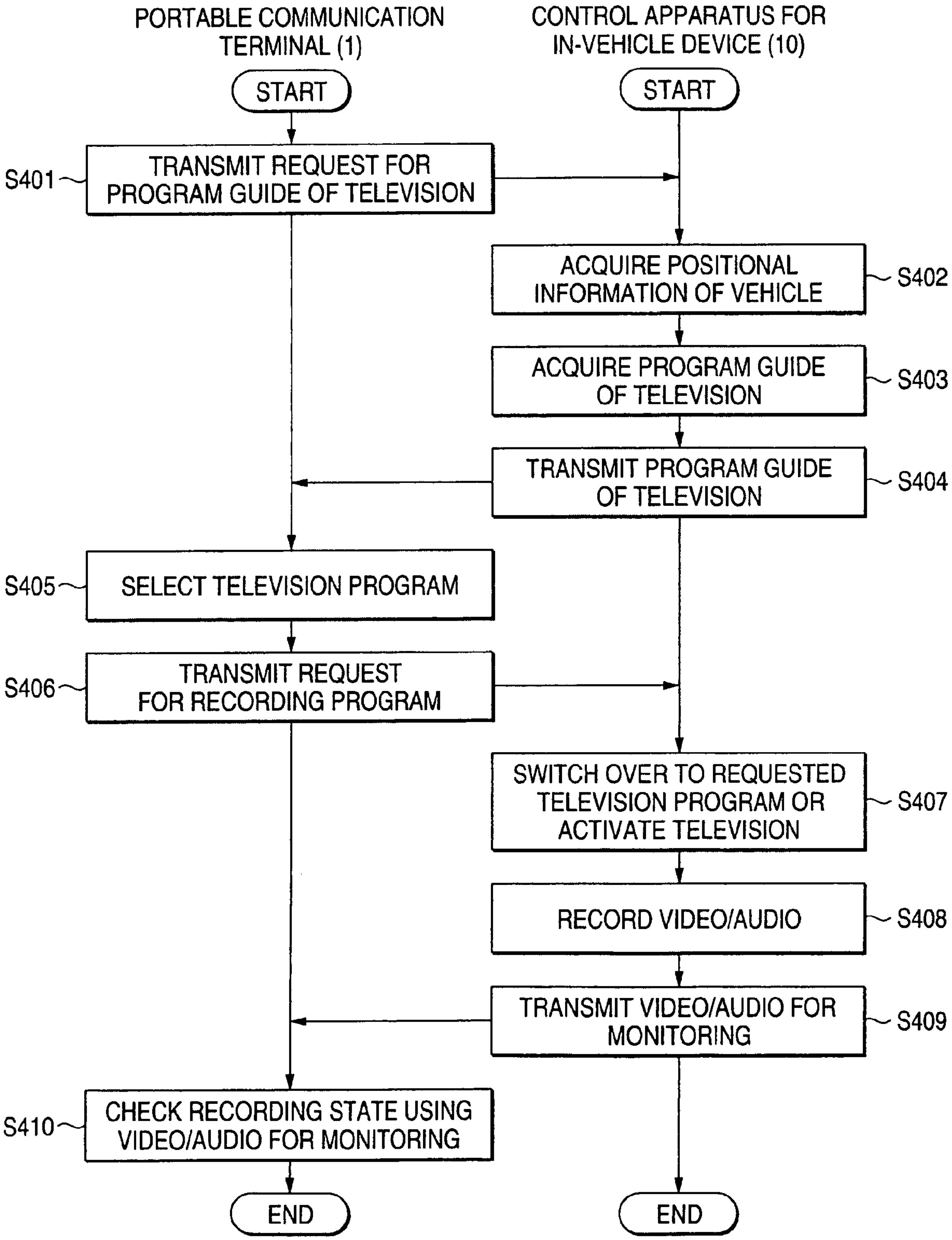
FIG. 4 is a flow chart showing video/audio recording procedures of a television program executed by the control apparatus for an in-vehicle device shown in FIG. 2.

Next, video/audio recording procedures of television program executed by the control apparatus 10 for an in-vehicle device shown in FIG. 2 will be described. FIG. 4 is a flow chart showing the video/audio television program recording procedures executed by the control apparatus 10 for an in-vehicle device shown in FIG. 2. As shown in FIG. 4, firstly, the portable communication terminal 1 transmits a request for a program guide to the control apparatus 10 for an in-vehicle device (step S401). Then, when the control section 17 receives the request for a program guide from the portable communication terminal 1, the control section 17 acquires positional information of a vehicle from the navigation system 12 (step S402). The program-guide acquisition section 17*a* acquires a television program guide corresponding to the position of the vehicle, for a television mounted on the vehicle (step S403). Specifically, the program guide acquisition section 17*a*acquires the television program guide corresponding to the position of the vehicle from the program-guide database 16*a*. For example, the program-guide acquisition section 17*a*acquires the television program guide corresponding to the position of the vehicle, which the navigation system 12 of the vehicle pinpoints, from the program-guide database 16*a*.

Further, the program-guide acquisition section 17*a* transmits the television program guide to the portable communication terminal 1 through the communication section 11 (step S404). Then, upon receiving the television program guide, the portable communication terminal 1 selects a television program (step S405), and transmits a recording request of the selected television program to the control apparatus 10 for an in-vehicle device (step S406). For example, a user of the portable communication terminal 1 operates the portable communication terminal 1 to select a desired program from the received television program guide and to transmit the recording request to the control apparatus 10 for an in-vehicle device.

Further, when the video/audio recording section 17*b* receives the recording request of the television program, the video/audio recording section 17*b* switches over to the required television program or activates the television (step S407) and records video/audio in the recorded video/audio data 16*b* (step S408). Specifically, when the video/audio recording section 17*b* receives the recording request, the video/audio recording section 17*b* controls the television tuner 13 to receive the selected television program. If necessary, the video/audio recording section 17*b* activates the television tuner 13. Then, the recording-state check section 17*c* transmits video/audio for monitoring to the portable communication terminal 1 (step S409). Further, the portable communication terminal 1 displays the video/audio for monitoring, and a user checks a recording state (step S410).

As described above, in embodiment 1, the program-guide acquisition section 17*a* acquires the program guide corresponding to the position of the vehicle, for a television mounted on the vehicle. The communication section 11 transmits the acquired program guide to the portable communication terminal 1. The video/audio recording section 17*b* selects a program of the television mounted on the vehicle from the program guide on the basis of an instruction by the portable communication terminal 1, and records the video/audio of the selected program. Accordingly, it is possible to record a broadcasting program of a television channel corresponding to a position of a vehicle.

Also, the program-guide acquisition section 17*a* acquires the program guide corresponding to the position of the vehicle from the program-guide database 16*a*, and transmits the acquired program guide to the portable communication terminal 1. Therefore, it is possible to easily acquire a program guide at any time, and to record a broadcasting program of a television channel corresponding to the position of the vehicle.

In addition, the program-guide acquisition section 17*a* acquires the program guide corresponding to the position of the vehicle, which the navigation system 12 pinpoints, from the program-guide database 16*a*, and transmits the acquired program guide to the portable communication terminal 1. Accordingly, it is possible to easily pinpoint the position of the vehicle, and to record a broadcasting program of a television channel corresponding to the position of the vehicle.

Embodiment 2

In the meantime, in embodiment 1, described is the case where the control apparatus 10 for an in-vehicle device is applied to a control system for an in-vehicle device, and the control apparatus 10 for an in-vehicle device records video/audio of a program. However, this invention is not limited to this. The control apparatus for an in-vehicle device may record an image captured by a camera in preference to a broadcasting program during the recording of the broadcasting program. In embodiment 2, a case where the control apparatus for an in-vehicle device is applied to a control system for an in-vehicle device and records images of an inside and an outside of a vehicle captured by a camera in preference to a broadcast program during the recording of the broadcasting program of a television mounted on a vehicle, will be described.

Figure 5:
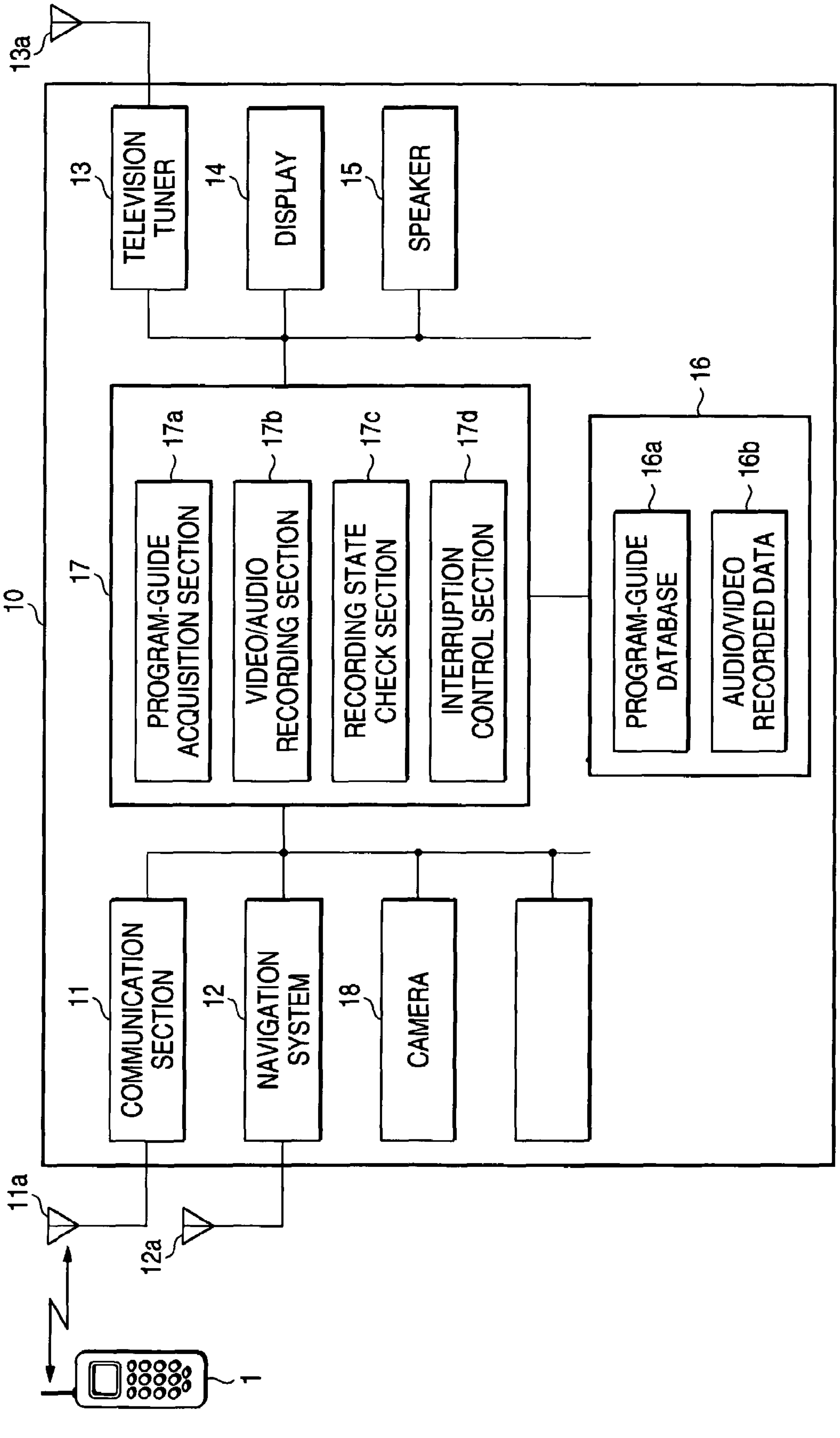
FIG. 5 is a function-block diagram showing a configuration of a control system for an in-vehicle device according to an embodiment 2.

First, a configuration of the control system for an in-vehicle device according to embodiment 2will be described. FIG. 5 is a function-block diagram showing a configuration of the control system for an in-vehicle device according to embodiment 2. As shown in FIG. 5, the function-block diagram of FIG. 5 is basically the same as the function-block diagram of FIG. 2 of embodiment 1. Therefore, the same reference numerals and signs are given to the same members, and explanation thereon will be omitted. Hereinafter, different members will be described.

Figure 6:
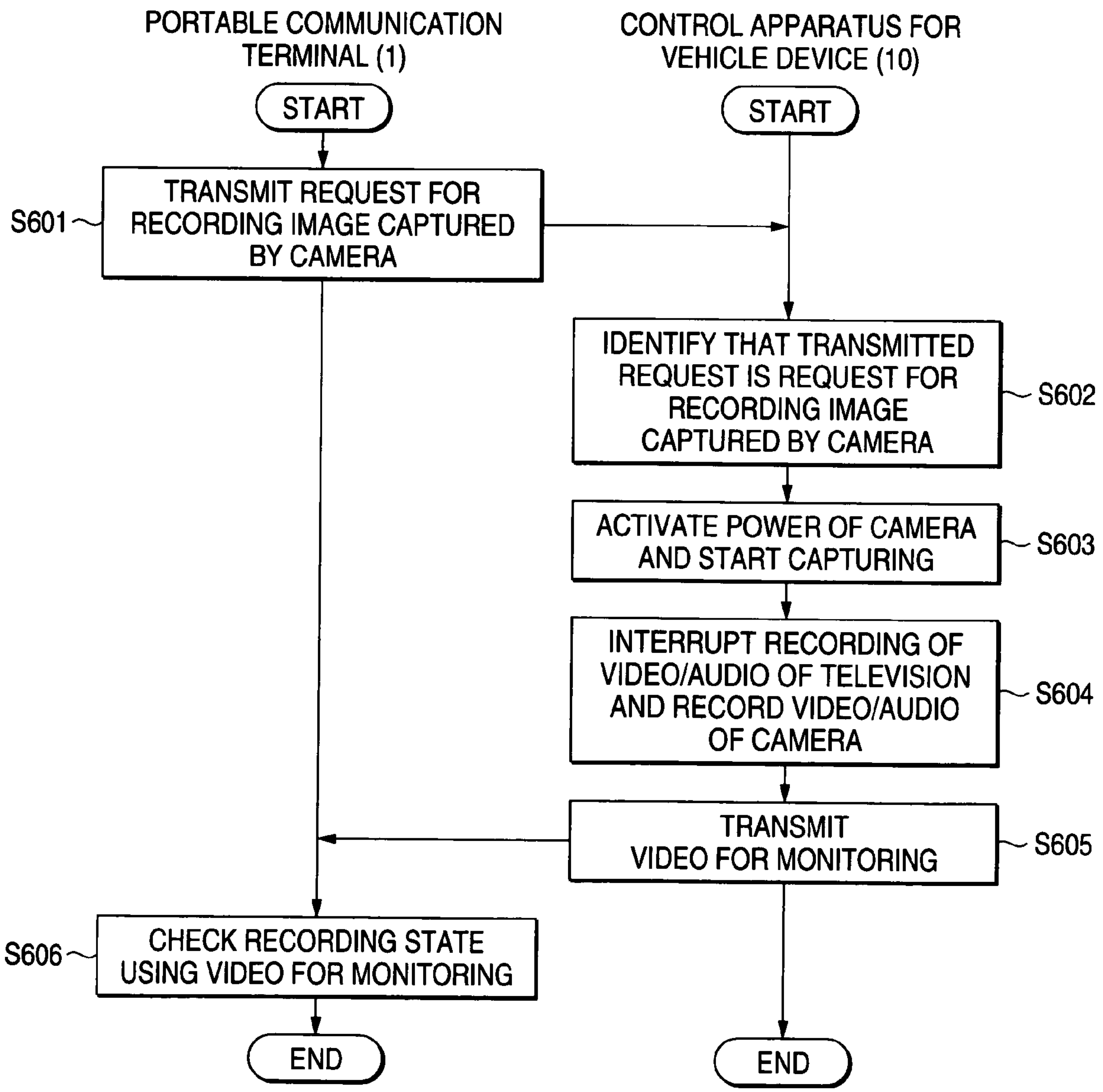
FIG. 6 is a flow chart showing interruption control procedures of camera images executed by the control apparatus for an in-vehicle device shown in FIG. 5.

A camera 18 is an image capturing device that captures images of an inside and an outside of a vehicle and is attached to the vehicle for the purpose of security. If necessary, a plurality of cameras 18 maybe attached to a vehicle. In addition, an interruption control section 17*d* controls each section so as to record images captured by the camera 18 in preference to video/audio of a broadcasting program of a television on the basis of an instruction by the portable communication terminal 1. Specifically, even if the video/audio recording section 17*b* is recording the video/audio of the broadcasting program of a television, the interruption control section 17*d* controls each section so as to temporarily interrupt the recording of the video/audio of the broadcasting program of a television and record images captured by the camera 18 in preference to the video/audio of the broadcasting program of the television Next, an interruption control procedure of camera images executed by the control apparatus 10 for an in-vehicle device shown in FIG. 5 will be described. FIG. 6 is a flow chart showing the interruption control procedure of camera images executed by the control apparatus 10 for an in-vehicle device shown in FIG. 5. As shown in FIG. 6, a recording request of the image of the camera is transmitted from the portable communication terminal 1 to the control apparatus 10 for an in-vehicle device (step S601).

Then, when the control section 17 receives the recording request of the image of the camera from the portable communication terminal 1, the control section 17 identifies that the received request is the recording request of the image of the camera (step S602), activates a power supply of the camera, and starts capturing (step S603). Further, the interruption control section 17*d* interrupts recording of video/audio of a broadcasting program of a television channel, and records the image of the camera in the recorded video/audio-data 16*b* (step S604).

Then, the recording-state check section 17*c* transmits a monitoring video to the portable communication terminal 1 (step S605). Further, the portable communication terminal 1 displays the monitoring video, and checks a recording state (step S606).

As described above, in embodiment 2, the camera 18 captures images of an inside and an outside of a vehicle. The interruption control section 17*d* executes interruption control so as to record an image captured by the camera in preference to the video/audio of the program of the television on the basis of an instruction by the portable communication terminal 1. Therefore, it is possible to record images of an inside and an outside of a vehicle, which are captured by the camera 18, in preference to a broadcast program during the recording of the broadcasting program.

In the meantime, in the above-described embodiments 1 and 2, described is a case that communication is carried out between the portable communication terminal 1 and the control apparatus 10 for an in-vehicle device, and a request for a program guide, a recording request of video/audio, check of a recording state, etc. are transmitted and received. However, the invention is not limited thereto. The control system for an in-vehicle device may be configured that a base station is interposed between the portable communication terminal 1 and the control apparatus 10 for an in-vehicle device; that communication is carried out from the portable communication terminal 1 to the control apparatus 10 for an in-vehicle device through the base station; and that a request for a program guide, a recording request of video/audio, check of a recording state, etc. are transmitted and received. In this case, the portable communication terminal 1 may receive program guides of a television and a radio etc. from the base station.

In addition, in the above-described embodiments 1 and 2, described is a case that communication is carried out between the portable communication terminal 1 and the control apparatus 10 for an in-vehicle device. However, the invention is not limited thereto. The invention may be applied to a case that communication is carried out between a communication terminal other than the portable communication terminal, e.g., a personal computer equipped with a wireless communication function, and the control apparatus 10 for an in-vehicle device.

In addition, in the above-described embodiments 1 and 2, described is a case that video/audio of a broadcasting program of a television are recorded. However, the invention is not limited thereto alone. This invention may be applied to a case that video/audio of another broadcasting program, e.g., audio of a broadcasting program of a radio is recorded.

In addition, in the above-described embodiments 1 and 2, described is a case that a television is analog receiver. However, the invention is not limited thereto alone. This invention is also applicable to a case that a television is a digital receiver.

In addition, in the above-described embodiments 1 and 2, described is a case that recording of video/audio is carried out in a single channel. However, the invention is not limited thereto alone. The invention is also applicable to a case that recording of video/audio is carried out in a plurality of channels. In this case, even in case of recording an image captured by the camera 18 in preference to video/audio of a broadcasting program of a television, it is possible to carry out picture recording (so-called, backside picture recording) without interrupting video/audio of a broadcasting program of a television.

As described above, a control apparatus for an in-vehicle device is useful for controlling an in-vehicle device mounted on a vehicle, such as a television, a radio, a camera, etc. In particular, the control apparatus for an in-vehicle device is suitable for control of displaying, recording, capturing etc. of an in-vehicle device such as a television, a radio, a camera, etc.

FIG. 2

10 control apparatus for an in-vehicle device
11 communication section
12 navigation system
13 television tuner
14 display
15 speaker
16 storage section
16*a* program-guide database
16*b* video/audio recorded data
17 control section
17*a* program-guide acquisition section
17*b* video/audio recording section
17*c* recording-state check section

FIG. 4

S401 transmit a request for a program guide of television
S402 acquire positional information of a vehicle
S403 acquire a program guide of television
S404 transmit the program guide of television
S405 select television program
S406 transmit a request for recording a program
S407 switch over to the requested television program or activate a television
S408 record video/audio
S409 transmit video/audio for monitoring
S410 check recording state using the video/audio for monitoring

FIG. 5

10 control apparatus for an in-vehicle device
11 communication section
12 navigation system
13 television tuner
14 display
15 speaker
16 storage section
16*a* program-guide database
16*b* video/audio recorded data
17 control section
17*a* program-guide acquisition section
17*b* video/audio recording section
17*c* recording-state check section
17*d* interruption control section
18 camera

FIG. 6

S601 transmit a request for recording an image captured by a camera
S602 identify that the transmitted request is a request for recording the image captured by the camera
S603 activate power of the camera and start capturing
S604 interrupt recording of video/audio of television and record video/audio of the camera
S605 transmit video for monitoring
S606 check a recording state using the video for monitoring

What is claimed is:

1. A control apparatus for an in-vehicle device, comprising:

an acquisition/transmission unit that acquires a program guide corresponding to a position of a vehicle and transmits the acquired program guide to a communication terminal device;

a recording unit that selects at least one program from the acquired program guide on a basis of an instruction transmitted from the communication terminal device and records at least one of video and audio of the selected program;

an image capturing unit that captures an image of at least one of an inside and an outside of the vehicle; and an interruption control unit that controls the recording unit to stop recording the video and audio of the selected program and start recording the image captured by the image capturing unit in preference to the video and audio of the selected program, on a basis of the instruction transmitted from the communication terminal device.

2. The control apparatus according to claim 1, further comprising:

a program-guide database that stores:

information indicating a correspondence relation at least among areas, broadcast stations, and frequencies; and the program guide for each area, wherein the acquisition/transmission unit acquires the program guide corresponding to the position of the vehicle from the program-guide database and transmits the acquired program guide to the communication terminal device.

3. The control apparatus according to claim 1, wherein:

the acquisition/transmission unit acquires the program guide corresponding to the position of the vehicle, which is pinpointed by a navigation system of the vehicle, and transmits the acquired program guide to the communication terminal device.

4. A method for controlling an in-vehicle device, comprising:

acquiring a program guide corresponding to a position of a vehicle;

transmitting the acquired program guide to a communication terminal device;

selecting at least one program from the acquired program guide on a basis of an instruction transmitted from the communication terminal device;

recording at least one of video and audio of the selected program;

capturing an image of at least one of an inside and an outside of the vehicle; and stopping recording the video and audio of the selected program and starting recording the captured image in preference to the video and audio of the selected program, on a basis of the instruction transmitted from the communication terminal device.

5. A computer readable medium encoded with a program operable to cause a computer to execute the method according to claim 4.

* * * * *